United States Patent
Cho (10) Patent No.: US 6,222,913 B1
(45) Date of Patent: Apr. 24, 2001

(54) METHOD AND APPARATUS FOR DISPLAYING CALLER INFORMATION DURING CALL SWITCHING IN PRIVATE BRANCH EXCHANGE

(75) Inventor: Seung-Hwan Cho, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/062,666

(22) Filed: Apr. 20, 1998

(30) Foreign Application Priority Data

Apr. 18, 1997 (KR) .................................................. 97/14517

(51) Int. Cl.[7] ...................................................... H04M 1/56
(52) U.S. Cl. .......................... 379/142; 379/156; 379/164; 379/183; 379/212
(58) Field of Search ..................................... 379/142, 156, 379/163, 198, 203, 211, 214, 218, 219, 228, 231, 164, 179, 182, 183, 212

(56) References Cited

U.S. PATENT DOCUMENTS

| | | | |
|---|---|---|---|
| 5,023,868 | * 6/1991 | Davidson et al. | 379/112 |
| 5,228,073 | 7/1993 | Smith . | |
| 5,267,307 | * 11/1993 | Izumi et al. | 379/354 |
| 5,396,548 | * 3/1995 | Bayerl et al. | 379/140 |
| 5,533,102 | * 7/1996 | Robinson et al. | 379/202 |
| 5,799,074 | * 8/1998 | Mano et al. | 379/164 |

FOREIGN PATENT DOCUMENTS 2301262   11/1996   (GB) .

* cited by examiner

*Primary Examiner*—Curtis A. Kuntz
*Assistant Examiner*—Binh K. Tieu
(74) *Attorney, Agent, or Firm*—Robert E. Bushnell, Esq.

(57) ABSTRACT

An exchange system displays caller information on the display of a subscriber terminal during call switching. The exchange system includes a plurality of extension terminals, each having a display, an operator for switching a call between a subscriber and a caller, and an exchange for switching the call among the extension terminals, the operator and the caller. The exchange transfers a call reception message to the operator upon receiving an incoming call from the caller, and the operator transfers a hook-off message to the exchange in response to the call reception message received. Then, responding to the hook-off message received, the exchange forms a communication path between the caller and the operator, and the operator receives information about the caller and the subscriber with whom the caller desires to talk through the communication path, and then transfers a message corresponding thereto to the exchange. Thereafter, the exchange sends a ring signal to the terminal of the subscriber in response to the message being received, and simultaneously outputs the information about the caller to the display of the subscriber.

31 Claims, 8 Drawing Sheets

```
TRANSFER FROM OPERATOR

CALLER NAME : SAINT CHO
```

TRANSFER FROM OPERATOR
CALLER NAME : SAINT CHO

FIG. 8

METHOD AND APPARATUS FOR DISPLAYING CALLER INFORMATION DURING CALL SWITCHING IN PRIVATE BRANCH EXCHANGE

CLAIM OF PRIORITY

This application makes reference to, incorporates the same herein, and claims all 35 U.S.C. § 119 from an application entitled Method And Apparatus For Displaying, Caller Information During Call Switching In Private Branch Exchange earlier filed in the Korean Industrial Property Office on Apr. 18, 1997, and there duly assigned Ser. No. 97-14517 by that office.

BACKGROUND OF THE INVENTION

Technical Field

The present invention relates to a method and apparatus for displaying caller information during switching of an incoming call in a private branch exchange and, in particular, to a method and apparatus for displaying caller information on a display of an extension terminal during switching of an incoming call.

In general, a private branch exchange (hereinafter referred to as "PBX") switches an incoming call from an office line or an extension line to a specified extension line in response to a call switching request.

In that regard, a PBX system generally includes a PBX, subscriber terminals (i.e., extension telephones), and a control terminal.

The PBX itself can have various configurations, but typically includes at least a controller, a switching circuit, a memory, and a tone generator. As explained in more detail below, such PBX systems have various disadvantages.

For example, the call switching method employed in such PBX systems is typically quite sophisticated, in that an incoming call is switched to a specified extension line in response to a call switching request from an originating central office line or an extension line. Moreover, in such a PBX system, a control terminal sends a ring signal only when switching an incoming call to designated extension line. This result in disadvantage in that, in a order to recognize the caller, the subscriber must answer the switched incoming call. In addition, since the subscriber can not recognize the call before he or she answers the incoming call from the central office line, the subscriber can not handle the incoming call promptly.

U.S. Pat. No. 5,228,073, Smith discloses a call identification display system which includes a reception unit, at least one remote user unit, and a communication link. The reception unit disclosed in this patent has a data entry device for entering a message relative to an incoming caller and a display device, and each remote user unit includes a display device displaying the message from the reception unit identifying the incoming caller, as well as an instructions selector for selecting one of a number of predetermined instruction for display on the display device in the reception unit.

Nevertheless, the disclosure of the patent does not provide a solution to the problems identified herein.

Particularly, there is a need for the development of a call switching method and apparatus which not only allows the subscriber to recognize a caller without answering an incoming call, but also provides for the outputting of caller information through a subscriber terminal, as well as the capability whereby a subscriber can recognize in advance the name of a caller prior to answering an incoming call from a central office line, thereby permitting the subscriber to handle the incoming call promptly.

SUMMARY OF THE INVENTION

It is, therefore, an object of the present invention to provide a call switching method and apparatus which allows a subscriber to recognize a caller without answering an incoming call.

It is another object of the present invention to provide a call switching method and apparatus for outputting caller information through a subscriber terminal.

It is still another object of the present invention to provide a method and apparatus for switching a call, wherein a subscriber can recognize in advance the name of a caller prior to answering an incoming call from a central office line so that the subscriber can handle the incoming call promptly.

To achieve the above objects, there is provided a method and apparatus for displaying caller information during call switching in an exchange system. The exchange system includes: a plurality of extension terminals, each having a display; an operator for switching a call between a subscriber and a caller; and an exchange for switching the call among the extension terminals, the operator and the caller. The exchange transfers a call reception message to the operator upon receiving an incoming call from the caller, and the operator transfers a hook-off message to the exchange in response to the call reception message received. Then, responding to the hook-off message being received, the exchange forms a communication path between the caller and the operator, and the operator receives information about the caller and the subscriber with whom the caller desires to talk through the communication path. The operator then transfers a message corresponding thereto to the exchange. Thereafter, the exchange sends a ring signal to the terminal of the subscriber in response to the message received, and simultaneously outputs the information about the caller to the display of the subscriber.

BRIEF DESCRIPTION OF THE DRAWINGS

The objects and advantages of the present invention will become more apparent by describing in detail a preferred embodiment thereof with reference to the attached drawings in which.

DETAILED DESCRIPTION OF THE PREFERRED EMBODIMENT

A preferred embodiment of the present invention will be described hereinbelow in detail with reference to the accompanying drawings. Many specific details described in the specification and accompanying drawings are described for comprehensive understanding of the present invention. However, as is known to anyone skilled in the art, the present invention can be implemented without the details. In addition, detailed description of known operation and structure of the present invention is avoided lest it should obscure the subject matter of the present invention.

Figure 1:
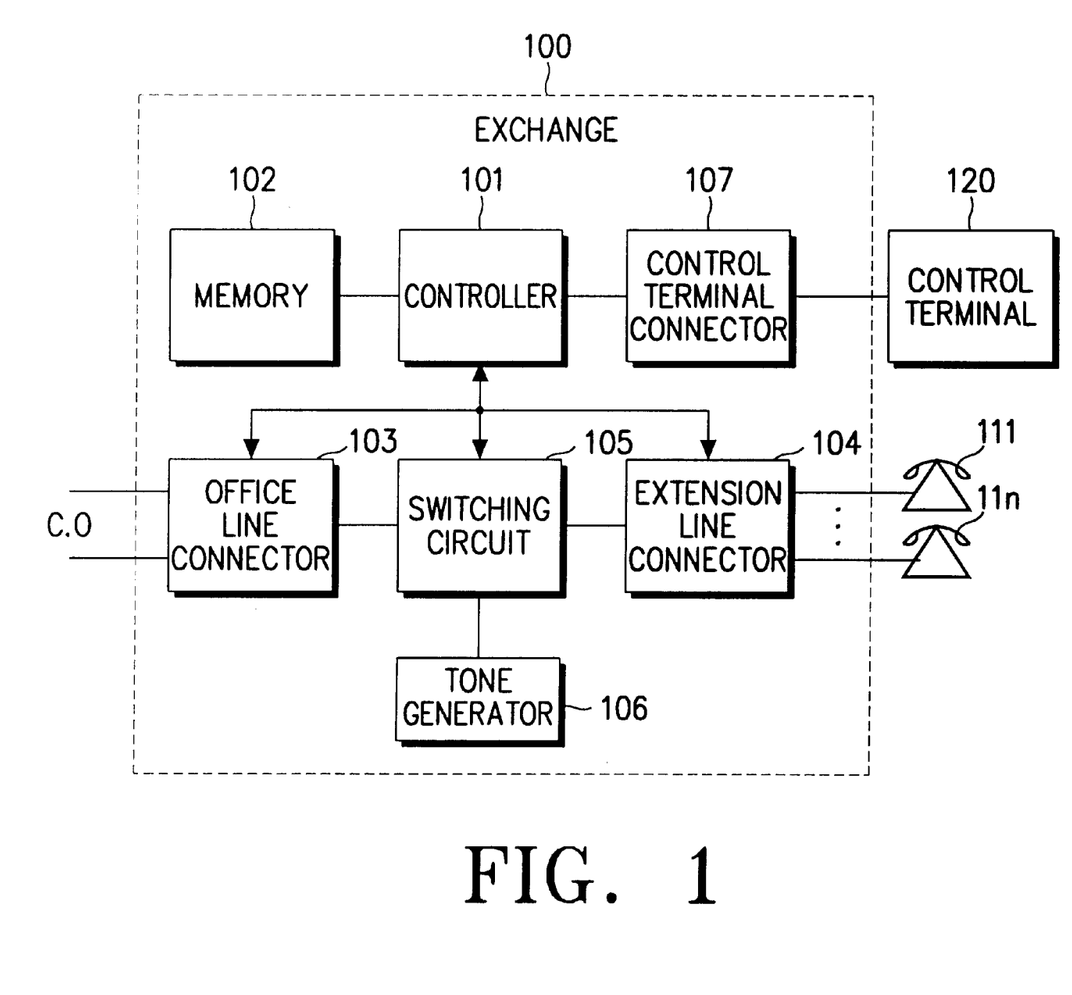
FIG. 1 is a block diagram of a private branch exchange (PBX) system to which the present invention is applied.

FIG. 1 shows the structure of a PBX system to which the present invention is applied, in which the PBX system includes a PBX 100, subscriber terminals (i.e., extension telephones) 111–11n and a control terminal 120.

Figure 2:
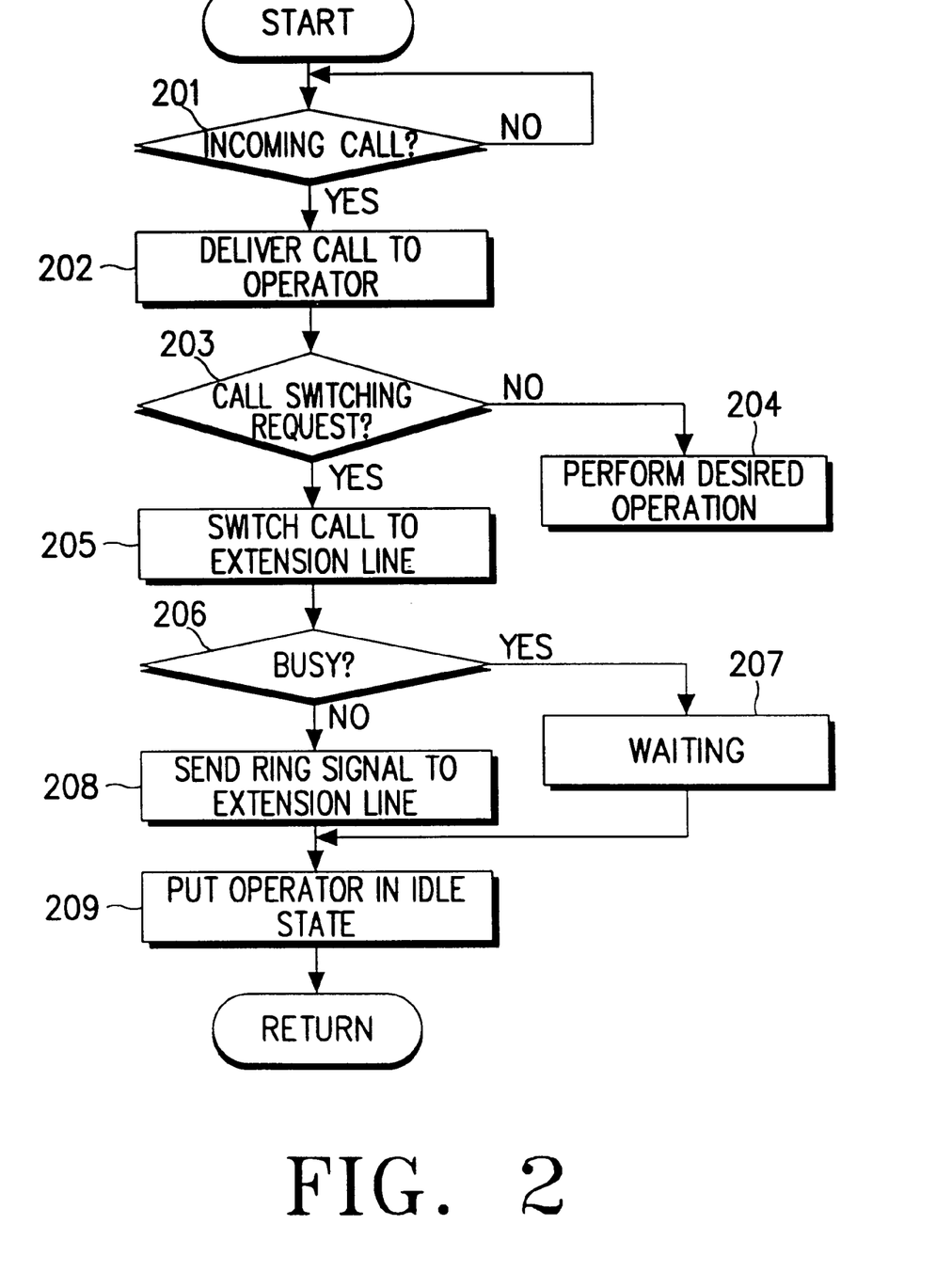
FIG. 2 is a flow chart for switching a call in a PBX system.

Referring to FIG. 1, the PBX 100 includes a controller 101, a memory 102, an office line connector 103, an extension line connector 104, a switching circuit 105, a tone generator 106, and a control terminal connector 107. The controller 101 performs an overall control operation with respect to the PBX 100. The memory 102 stores a control program for controlling the overall operation of the PBX 100, and also stores the data required and generated in the course of the control process. The office line connector 103 seizes a central office line CO to form a communication loop under the control of the controller 101, and interfaces signals between the central office line CO and the switching circuit 105. The central office line CO refers to a communication line extending between the office line connector 103 and a central switching system (not shown). The extension line connector 104 provides the extension telephones 111–11n with loop current under the control of the controller 101, and interfaces signals between the extension telephones 111–11n and the switching circuit 105. The switching circuit 105 switches various tones and voice data under the control of the controller 101. The tone generator 106 generates various tone signals under the control of the controller 101, and provides the generated tone signals to the switching circuit 105. The control terminal connector 107 serves as an interface between the controller 101 and the control terminal 120. The extension telephones 111–11n may be realized by a key telephone or an ordinary telephone having multiple function bottons. Each of the extension telephones 111–11n includes a display unit, such as an LCD (Liquid Crystal Display), to display thereon messages according to the operating status. The control terminal 120, being an operator or an operator console, receives the incoming call from the central office line CO, and switches the received incoming call to a specific subscriber with whom the other party wants to talk. A process for switching the call in a PBX system is illustrated in FIG. 2.

A method for switching the incoming call to an extension line in the PBX system will be described with reference to FIGS. 1 and 2. At step 201, the controller 101 determines whether there is an incoming call from the central office line CO or the extension line via the office line connector 103 and the extension line connector 104 respectively. If the incoming call is detected, the controller 101 delivers at step 202 the incoming call to the control terminal 120 via the control terminal connector 107. If the incoming call is not detected, the controller 101 continues to determine whether there is an incoming call. After receiving the incoming call, the controller 101 determines at step 203 whether a call switching request is received from the central office line or the extension line that has originated the call. If the call switching request is not received, the controller 101 performs a desired operation at step 204. However, upon receiving the call switching request, the controller 101 receives a desired extension line number from the originating extension line or central office line, and switches the incoming call to the specified extension line, at step 205. After switching the call, the controller 101 determines at step 206 whether the specified extension line is busy or not by using the extension line connector 104. If the specified extension line is busy, the controller 101 causes the originating extension line or central office line to wait at step 207. However, if the specified extension line is not busy, the controller 101 sends a ring signal to the specified extension line at step 208. At step 209, the controller 101 puts the control terminal 120 in an idle state.

As described above, the call switching method in the PBX system can simply switch the incoming call to the specified extension line in response to the call switching request from the originating central office line or extension line. Namely, in the PBX system, the control terminal sends the ring signal only when switching the incoming call to the desired extension line. Therefore, the subscriber must answer the switched incoming call in order to recognize the caller. Moreover, since the subscriber cannot recognize the caller before he or she answers the incoming call from the central office line, the subscriber cannot handle the incoming call promptly.

Figure 3:
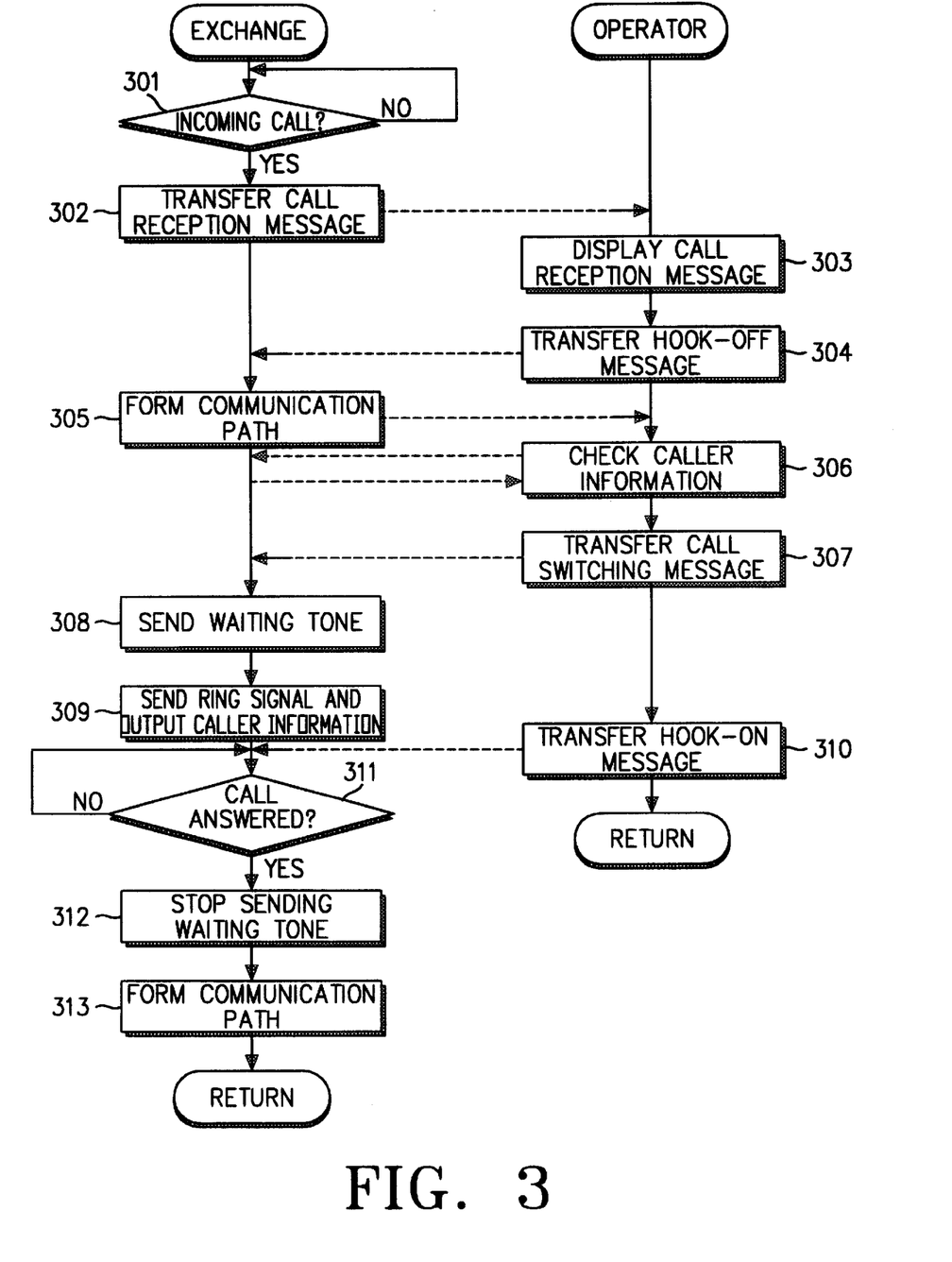
FIG. 3 is a flow chart for switching a call in a PBX system according to an embodiment of the present invention.

The PBX system according to an embodiment of the present invention stores in the memory 102 a control program having control functions as shown in FIG. 3, and the controller 101 loads the control program to perform the control operation. Furthermore, according to an embodiment of the present invention, the operator is preferably realized by a PC (Personal computer)-based control terminal 120. However, in practice, the operator may also be realized by an operator telephone or an operating device, such as the key telephone, having an input unit with which the user can input data.

Figure 4:
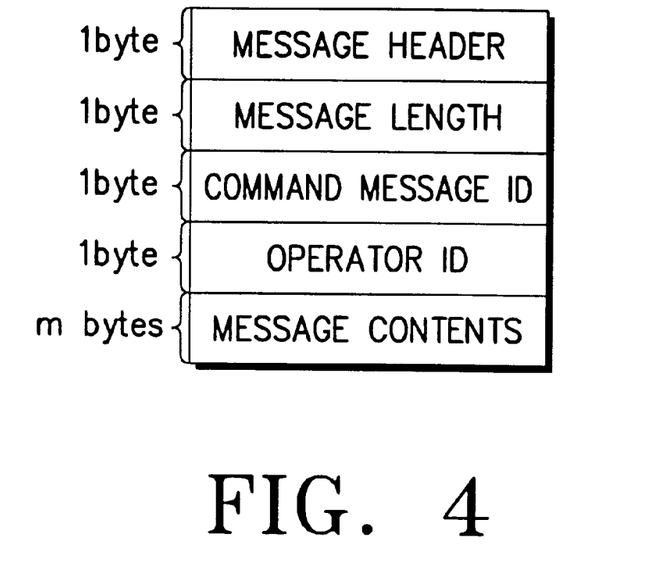
FIG. 4 is a diagram illustrating a fonnat of a command message according to an embodiment of the present invention.

FIG. 4 shows the format of an ordinary command message as transferred from the operator 120 to the PBX 100 according to an embodiment of the present invention. The command message includes a message header, a message length, a command message ID (Identification), an operator ID, and message contents.

Figure 5:
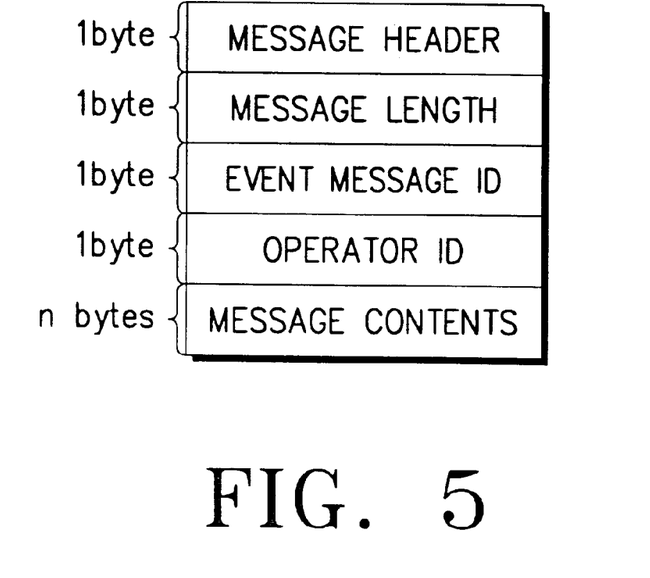
FIG. 5 is a diagram illustrating a format of an event message according to an embodiment of the present invention.

FIG. 5 shows the format of an event message transferred from the PBX 100 to the operator 120 according to an embodiment of the present invention. The event message includes a message header, a message length, an event message ID, an operator ID, and message contents.

Figure 6A:
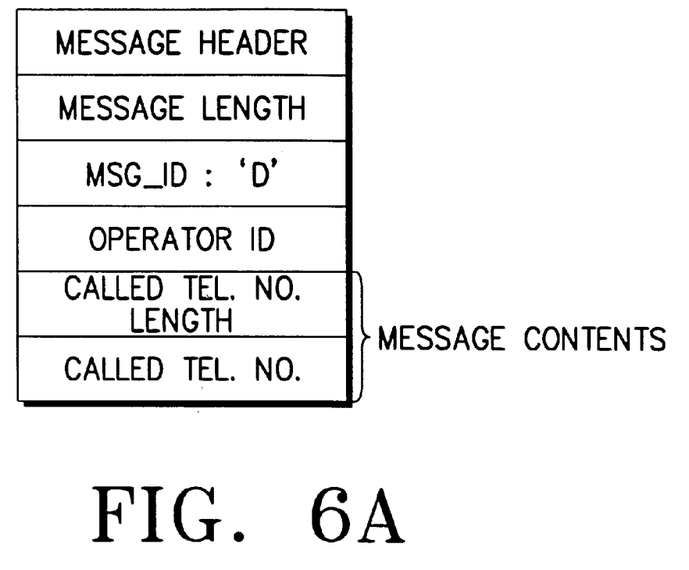
FIGS. 6A to 6F are diagrams illustrating formats of the command and event messages according to an embodiment of the present invention.

FIG. 6A shows the format of a dial message used when the operator desires to call the subscriber or an outside subscriber (i.e., a public network subscriber) according to an embodiment of the present invention. The dial message has a command message ID of 'D' (indicating "Dial"), and the message contents include the length of a called telephone number and the called telephone number.

Figure 6B:
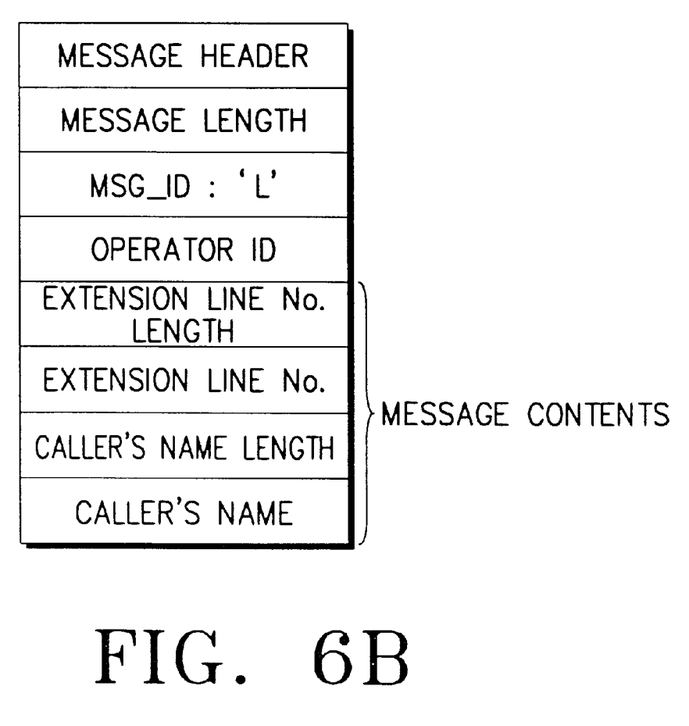

FIG. 6B shows the format of a call switching message used when the operator switches the incoming call to the desired extension line (by dialing with hook flash) in response to the call switching request according to an embodiment of the present invention. The switching message has a command message ID of 'L', and the message contents include the length of an extension telephone number to which the incoming call is to be switched, the extension telephone number, the length of a caller's (inside or outside subscriber's) name and the caller's name.

Figure 6C:
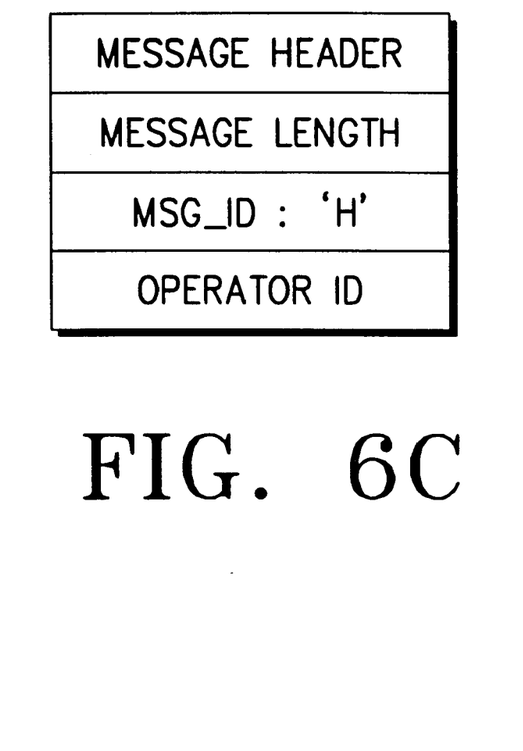

FIG. 6C shows the format of a hook-on message used when the operator terminates the call according to an embodiment of the present invention. The hook-on message has a command message ID of 'H', and does not include message contents.

Figure 6D:
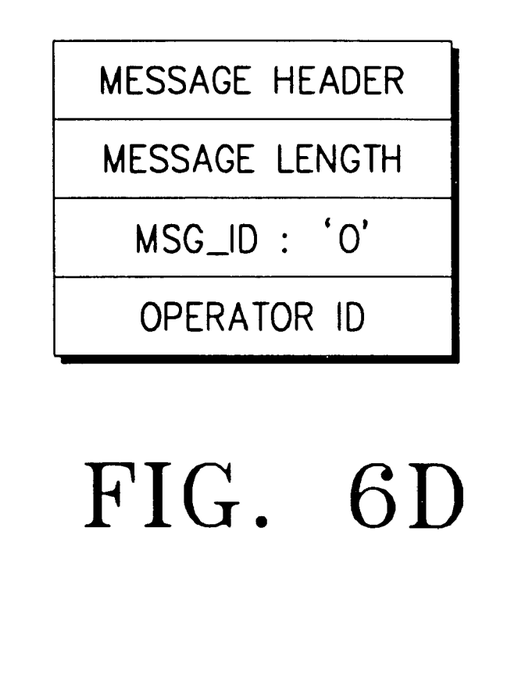

FIG. 6D shows the format of a hook-off message used when the operator makes a call or receives the incoming call according to an embodiment of the present invention. The hook-off message has a command message ID of 'O', and does not include message contents.

Figure 6E:
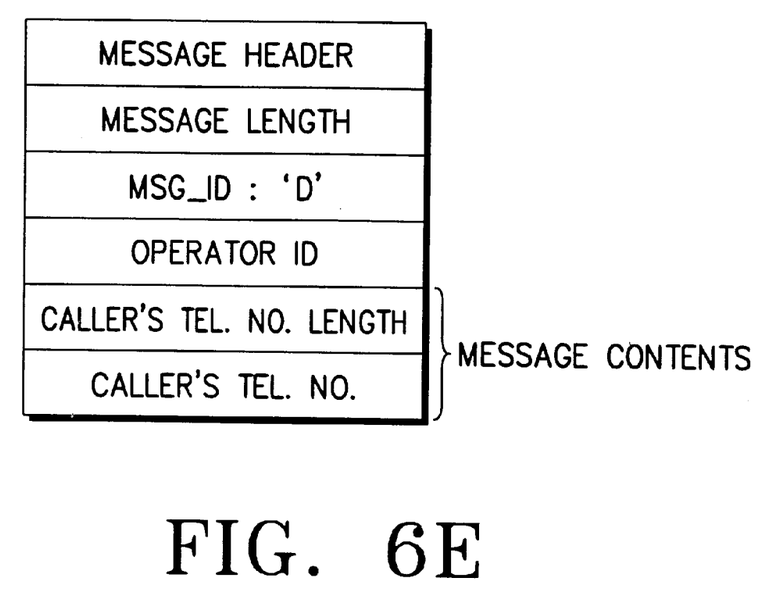

FIG. 6E shows the format of a call delivery message used when delivering the incoming call from the central office line or the extension line to the operator according to an embodiment of the present invention. The call delivery message has an event message ID of 'D', and the message contents include the length of a caller's telephone number and the caller's telephone number.

Figure 6F:
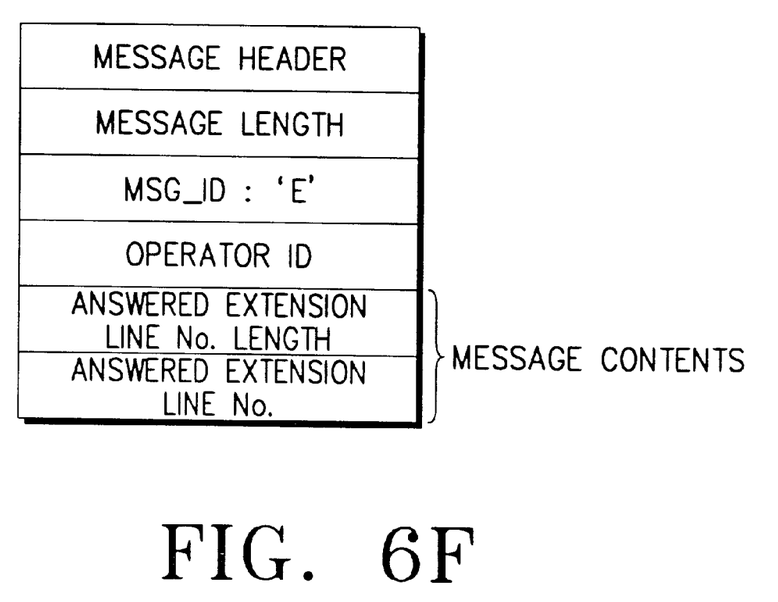

FIG. 6F shows the format of a call establishing message sent to the operator when the subscriber answers the call that the operator has originated according to an embodiment of the present invention. The call establishing message has an event message ID of 'E', and the message contents include the length of an answered extension telephone number and the answered extension telephone number.

Figure 7:
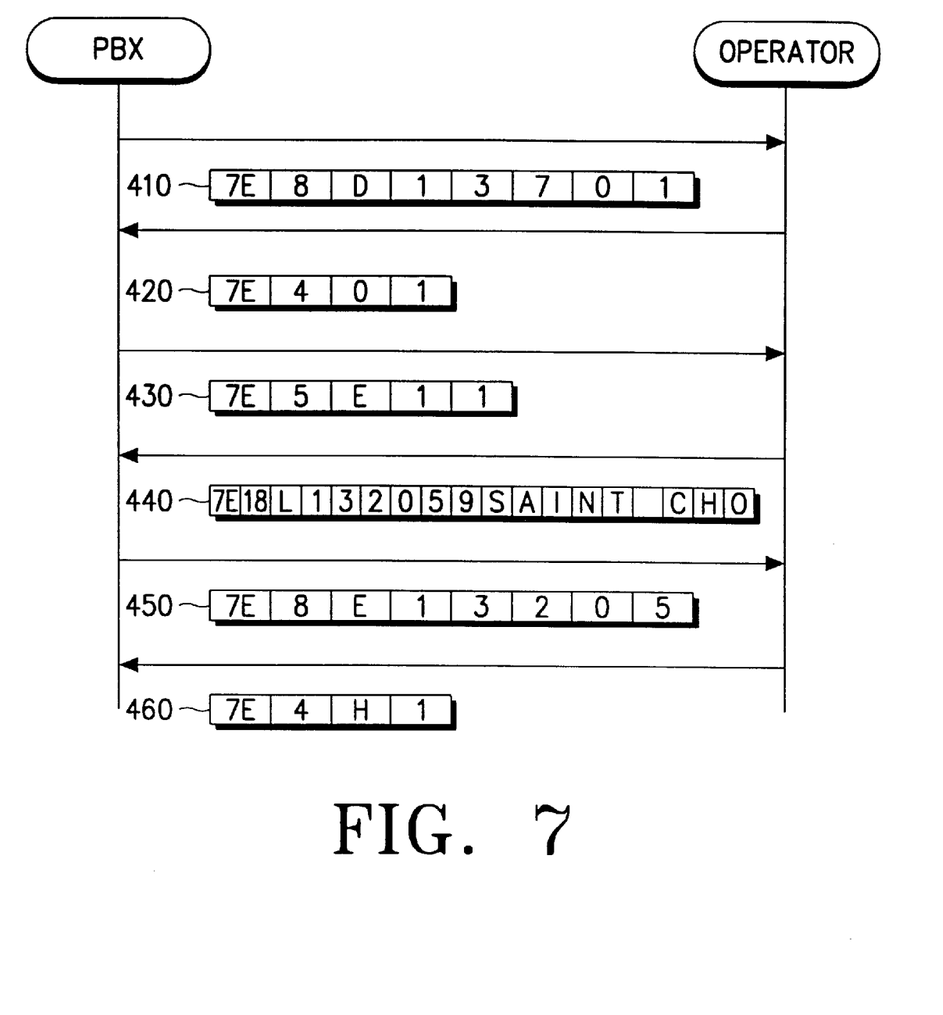
FIG. 7 is a diagram illustrating a process of transferring the command and event messages between a PBX and a control terminal in the PBX system according to an embodiment of the present invention.

FIG. 7 shows a process for transferring the command and event messages between the PBX 100 and the operator 120 in the PBX system according to the present invention. FIG. 7 illustrates a message flow in a case where the incoming call from a central office line No. 701 is delivered to an operator No. 1, and the operator switches the delivered call to an extension line No. 205 when the subscriber of the extension line No. 205 answers the call, by using the command and event messages shown in FIGS. 6A to 6F.

Figure 8:
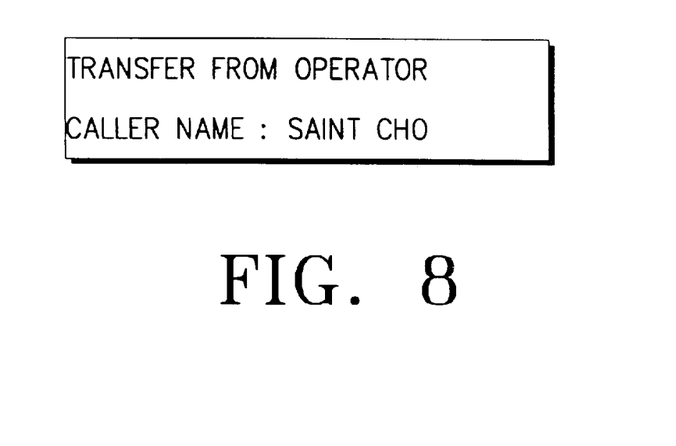
FIG. 8 is an exemplary diagram illustrating caller information output during call switching according to an embodiment of the present invention.

FIG. 8 shows an example of caller information displayed on the display of the extension telephone during the call switching, according to an embodiment of the present invention.

The method for displaying caller information during switching of the call in the PBX system will now be described with reference to FIGS. 1 to 8. At step 301 of FIG. 3, the PBX 100 (specifically, the controller 101) determines whether there is an incoming call from the central office line via the office line connector 103. If the incoming call is detected, the controller 101 transfers to control terminal 120 (at step 302) a message informing terminal 120 that the incoming call from the central office line has been detected. For example, in the case where the incoming call is received from the central office line No. 701 and delivered to the operator No. 1, the PBX 100 transfers to control terminal 120 a call delivery message 410, shown in FIGS. 7 and 6E, informing terminal 120 of the reception of the incoming call from the central office line. Upon receiving the call delivery message 410 through the control terminal connector 107, the control terminal 120 displays (at step 303) a message informing that the incoming call is being received from the central office line and being delivered to the control terminal 120. In response to the call delivery message 410, the control terminal 120 transfers (at step 304) a hook-off message 420, shown in FIGS. 7 and 6D, to the PBX 100 via the control terminal connector 107. Upon receiving the hook-off message 420, the controller 101 controls the office line connector 103 at step 305 to form a communication path to the outside (or inside) subscriber of the incoming call, and transfers to the control terminal 120 a call establishing message 430, shown in FIGS. 7 and 6F, informing terminal 120 that the communication path to the central office line is established. At step 306, the control terminal 120 checks the caller information through the formed communication path, and stores the caller information. Namely, the operator (control terminal 120) checks the name of the caller and a subscriber (extension telephone number) with whom the caller desires to talk, and then stores the caller information (i.e., caller's name). After storing the caller information, the control terminal 120 transfers (at step 307), to the PBX 100 through the control terminal connector 107, a call switching message 440, shown in FIGS. 7 and 6B, causing the PBX 100 to switch the incoming call to the subscriber with whom the caller desires to talk. For reference, the command message 440 indicates that a telephone number of the subscriber with whom the caller desires to talk is "205" and the caller's name is "SAINT CHO". At step 308, the controller 101 sends a waiting tone to the caller through the office line connector 103. While sending the waiting tone, the controller 101 sends (at step 309) a ring signal to the subscriber with whom the caller desires to talk and, at the same time, outputs the caller information to the display of the extension telephone of the subscriber.

As illustrated in FIG. 8, the caller information (i.e., the caller name) may be displayed in a specific format. At step 310, the control terminal 120 transfers to the PBX 100 a hook-on command message, shown in FIGS. 7 and 6C, causing the PBX 100 to complete the call switching. Thereafter, the controller 101 determines (at step 311) whether the subscriber of the extension line No. 205 answers the ring signal. If the subscriber answers in response to the ring signal, the controller 101 stops sending the waiting tone to the caller (at step 312). At the same time, the controller 101 establishes the communication path between the caller and the subscriber at step 313.

As described above, the PBX system of the invention outputs the caller information to the display of the extension telephone during call switching, so that the subscriber can recognize the caller information in advance and prior to answering the incoming call, thereby handling the incoming call promptly.

While the present invention has been described in detail with reference to the specific embodiment, it is clearly understood that many variations can be made by anyone skilled in the art within the scope and spirit of the present invention. Thus, the appropriate scope hereof is deemed to be in accordance with the claims as set forth below.

What is claimed is:

1. A method of displaying caller information during call switching in an exchange system which includes a plurality of extension terminals, each having a display, an operator control terminal for switching a call between a subscriber and a caller, and an exchange connected to said operator control terminal for switching the call among the extension terminals, the operator control terminal and the caller, said method comprising the steps of:

causing said exchange to transfer a call reception message to said operator control terminal upon receiving an incoming call from the caller;

causing said exchange to transfer a call delivery message to said operator control terminal;

causing said operator control terminal to respond to said call delivery message by displaying a message informing the subscriber that the incoming call is being delivered to the operator control terminal;

causing said operator control terminal to transfer a hook-off message to said exchange in response to said call reception message being received;

causing said exchange to form a communication path between the caller and the operator control terminal in response to the hook-off message being received;

causing said operator control terminal to receive information about the caller and the subscriber with whom the caller desires to talk through said communication path, and to transfer a message corresponding thereto to the exchange; and causing said exchange to send a ring signal to the terminal of the subscriber in response to the message being received, and simultaneously to output said information about the caller to the display of the subscriber.

2. The method as claimed in claim 1, wherein said caller is one of an inside subscriber and a public network subscriber.

3. The method as claimed in claim 2, wherein said caller information comprises a name of the caller.

4. The method as claimed in claim 2, wherein said caller information comprises an extension telephone number to which the incoming call is to be switched, and a name of the caller.

5. The method as claimed in claim 1, further comprising the step, prior to said step of causing said exchange to send a ring signal to the terminal of the subscriber, of causing said exchange to send a waiting tone to the caller.

6. The method as claimed in claim 5, further comprising the steps of determining whether the subscriber has answered the ring signal and, when the subscriber has answered the ring signal, stopping the sending of the waiting tone.

7. The method as claimed in claim 6, further comprising the step of forming a communication path between the caller and the subscriber when the subscriber answers the ring signal.

8. The method as claimed in claim 1, further comprising the step of causing said controller to transfer a call establishing message to the operator control terminal informing that the communication path is established.

9. The method as claimed in claim 1, further comprising the step of causing said operator control terminal to transfer a call switching message to the controller, and causing said controller to switch the incoming call to the subscriber.

10. An apparatus for displaying caller information during call switching between a subscriber and a caller, said apparatus comprising an operator control terminal and an exchange interconnecting said operator control terminal and a plurality of extension terminals;

wherein said exchange transfers a call reception message to said operator control terminal upon receiving an incoming call from the caller;

wherein said exchange transfers a call delivery message to said operator control terminal;

wherein said operator control terminal responds to said call delivery message by displaying a message informing the subscriber that the incoming call is being delivered to the operator control terminal;

wherein said operator control terminal transfers a hook-off message to said exchange in response to said call reception message being received;

wherein said exchange forms a communication path between the caller and the operator control terminal in response to the hook-off message being received;

wherein said operator control terminal receives information about the caller and the subscriber with whom the caller desires to speak through said communication path, and transfers a message corresponding thereto to the exchange; and wherein said exchange sends a ring signal to the terminal of the subscriber in response to the message being received, and simultaneously outputs said information about the caller to a display of the subscriber.

11. The apparatus as claimed in claim 10, wherein said caller is one of an inside subscriber and a public network subscriber.

12. The apparatus as claimed in claim 11, wherein said caller information comprises a name of the caller.

13. The apparatus as claimed in claim 11, wherein said caller information comprises an extension telephone number to which the incoming call is to be switched, and the name of the caller.

14. The apparatus as claimed in claim 10, wherein said exchange sends a waiting tone to the caller prior to sending a ring signal to the terminal of the subscriber.

15. The apparatus as claimed in claim 14, wherein said exchange, after sending the ring signal to the terminal subscriber, determines whether the subscriber has answered the ring signal and, when the subscriber has answered the ring signal, said exchange stops sending said waiting tone to the caller.

16. The apparatus as claimed in claim 15, wherein said exchange forms a communication path between the caller and subscriber when it is determined that the subscriber has answered the ring signal.

17. The apparatus as claimed in claim 10, wherein said exchange comprises a controller.

18. The apparatus as claimed in claim 17, wherein said exchange further comprises a control terminal connector connected between said controller and the operator control terminal.

19. The apparatus as claimed in claim 17, wherein said exchange further comprises a switching circuit connected to said controller.

20. The apparatus as claimed in claim 19, wherein said exchange further comprises an extension line connector connected between said switching circuit and the subscriber terminals.

21. The apparatus as claimed in claim 19, wherein said exchange further comprises an office line connector connected between said switching circuit and a central office.

22. The apparatus as claimed in claim 19, wherein said exchange further comprises a tone generator connected to said switching circuit.

23. The apparatus as claimed in claim 17, wherein said exchange further comprises a memory connected to said controller.

24. The apparatus as claimed in claim 10, wherein said controller transfers a call establishing message to the operator control terminal informing that the communication path is established.

25. The apparatus as claimed in claim 10, wherein said operator control terminal transfers a call switching message to the controller, and said controller switches the incoming call to the subscriber.

26. An apparatus for displaying caller information during call switching between a subscriber and a caller, said apparatus comprising an operator control terminal and an exchange interconnecting said operator control terminal and a plurality of extension terminals;

wherein said exchange comprises a controller, a control terminal connector connected between said controller and said operator control terminal, a switch circuit connected to said controller, an extension line connector connected between said switch circuit and said plurality of extension terminals, an office line connector connected between said switch circuit and a central office, and a tone generator connected to said switch circuit;

wherein said controller determines whether there is an incoming call from a central office line via said office line connector;

wherein, when the incoming call is detected, said controller transfers a call reception message via said control terminal connector to said operator control terminal;

wherein said exchange transfers a call delivery message to said operator control terminal via said control terminal connector;

wherein said operator control terminal responds to reception of the call delivery message by displaying a message informing the subscriber that the incoming call from the central office is being received and delivered to the operator control terminal;

wherein said operator control terminal transfers a hook-off message to the controller via the control terminal connector;

wherein said controller responds to reception of the hook-off message by controlling the office line connector to form a communication path between the central office and the subscriber;

wherein said controller transfers a call establishing message via the control terminal connector to the operator control terminal informing that the communication path to the central office is established;

wherein said operator control terminal checks caller information received through the formed communication path and stores the caller information;

wherein said operator control terminal transfers a call switching message to the controller via the control terminal connector;

wherein said controller activates the switching circuit to switch the incoming call from the central office to the subscriber;

wherein said controller activates said tone generator via said switching circuit to generate a waiting tone to the caller via the office line connector; and wherein said controller activates the tone generator via said switching circuit to send a ring signal to the subscriber while simultaneously outputting the caller information to a display co-located with an extension line of the subscriber.

27. The apparatus as claimed in claim 22, wherein said caller is one of an inside subscriber and a public network subscriber.

28. The apparatus as claimed in claim 22, wherein said caller information comprises a name of the caller.

29. The apparatus as claimed in claim 27, wherein said caller information comprises an extension telephone number to which the incoming call is to be switched, and the name of the caller.

30. The apparatus as claimed in claim 26, wherein said exchange, after sending the ring signal to the subscriber, determines whether the subscriber has answered the ring signal and, when the subscriber has answered the ring signal, said exchange stops sending said waiting tone to the caller.

31. The apparatus as claimed in claim 30, wherein said exchange forms a communication path between the caller and subscriber when it is determined that the subscriber has answered the ring signal.

* * * * *